A. JONES.
TREATMENT OF ZINC RESIDUES.
APPLICATION FILED JULY 5, 1911.
1,112,010.
Patented Sept. 29, 1914.
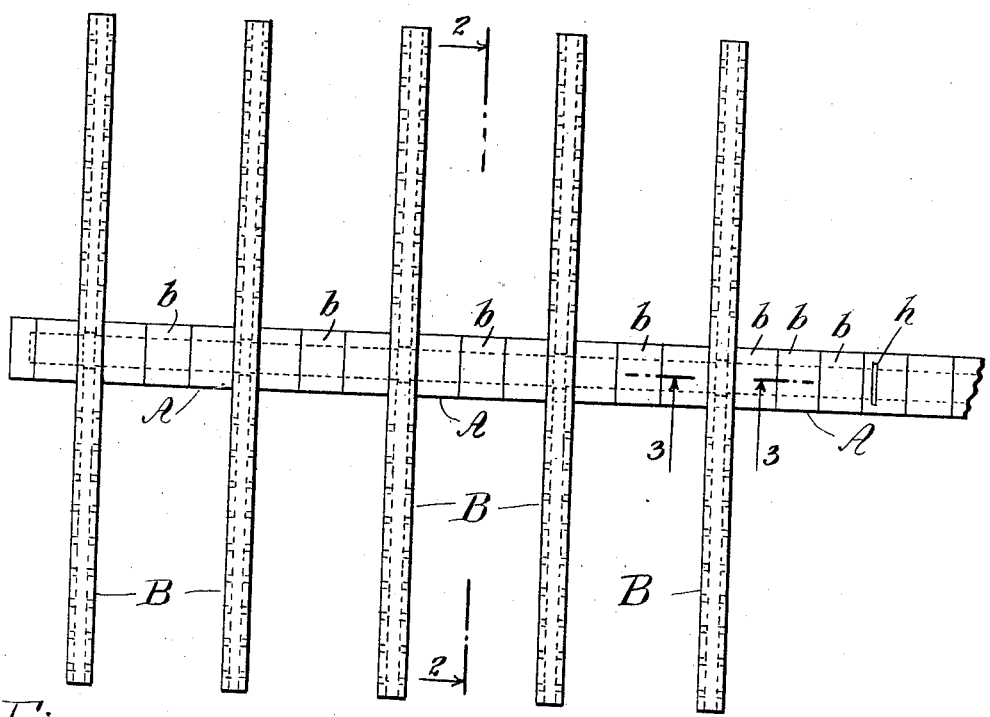
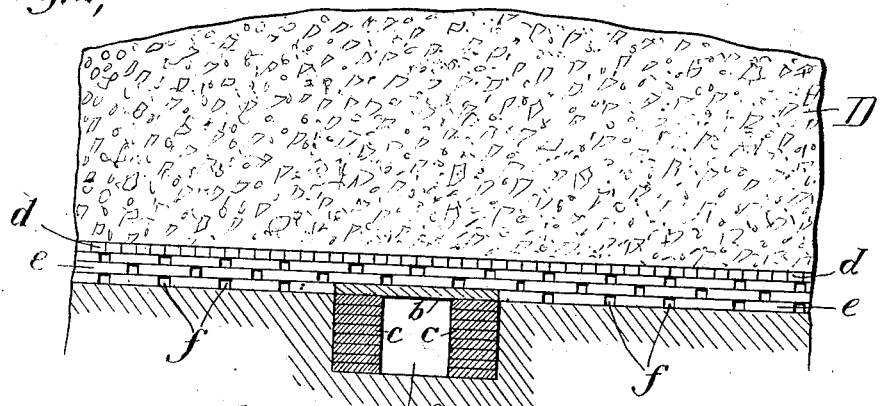
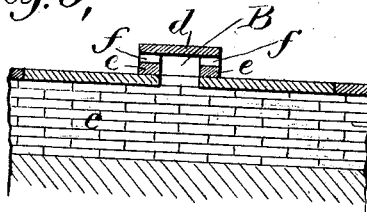

UNITED STATES PATENT OFFICE.

ARCHIBALD JONES, OF BARTLESVILLE, OKLAHOMA, ASSIGNOR TO BARTLESVILLE ZINC COMPANY, OF NEW YORK, N. Y., A CORPORATION OF NEW YORK.

TREATMENT OF ZINC RESIDUES.

1,112,010.  Specification of Letters Patent.  Patented Sept. 29, 1914.

Application filed July 5, 1911. Serial No. 636,972.

*To all whom it may concern:*

Be it known that I, ARCHIBALD JONES, a citizen of the United States, residing at Bartlesville, county of Washington, State of Oklahoma, have invented certain new and useful Improvements in the Treatment of Zinc Residues; and I do hereby declare the following to be a full, clear, and exact description of the invention, such as will enable others skilled in the art to which it appertains to make and use the same.

My invention relates to certain new and useful improvements in the treatment of zinc retort residues, for the purpose of bringing them into such a condition that they will be more readily salable by reason of the practical elimination of the carbon and zinc contained in them, and so that the freight rates for their transportation shall be lessened on account of the lessened weight and the concentration of the product incident to the practice of the invention. The elimination of the carbon is of especial importance where they are to be subsequently smelted in the reverbatory furnace. Moreover, the treatment to which the residues are subjected gives a product that is practically devoid of fines, the granular residue being sintered into a body which may be broken up into relatively large lumps of coherent material well suited for charging into the blast furnace.

In the accompanying drawing, Figure 1 represents a top plan view of an arrangement of flues suitable for putting my invention into practice; Fig. 2 represents a sectional elevation on the line 2—2 of Fig. 1, and with addition of the pile of residues under treatment; Fig. 3, represents a detail section on the line 3—3 of Fig. 1.

Similar letters of reference indicate similar parts throughout the several views.

Referring to the drawing, A indicates a longitudinal trench made in the ground along the surface thereof and covered over by fire-tiles *b*, set close together except where the trench is intersected by the cross flues B. At these places of intersection the fire-tiles *b* are spaced apart (as shown in Fig. 3) so that the longitudinal trench flue A communicates freely with the cross flues. The fire-tiles *b* rest upon the side walls *c* which line the sides of the trench flue throughout.

The cross flues B are hollow as shown. Their upper surfaces consist of fire brick *d* set close together, but their sides consist of fire-brick *e* spaced apart so as to leave series of openings *f* on both sides of each cross-flue. At one end, the longitudinal flue A is connected to a suitable source of air blast under a pressure of say 1 ounce to the foot with relation to the pile of residue D. A slide or register *h* governs the volume of the air supplied to the pile. A suitable source of air blast may be any ordinary fan blower, or the like, of appropriate power to deliver to the supply the necessary volume of air under the pressure required.

The mode of operation is as follows: The zinc residues to be treated are piled up, as indicated in Fig. 2, in such manner as to cover the space occupied by the series of cross flues. Inasmuch as the residues usually carry as high as from 30% to 40% of carbon, it is not necessary, unless in exceptional cases, to add any further fuel thereto except, perhaps, immediately adjoining the cross flues for the purpose of more readily initiating the ignition of the mass. Moreover, it will be preferable to begin the operation while the residues are still hot, as drawn from the retorts, so that they will ignite more readily.

When the pile has thus been established, air, blown in through the main flue or trench A, is distributed by the cross-flues B and passing through the openings *f* effects the combustion of the carbonaceous material contained in the residues. This combustion is propagated throughout the mass, and results finally in the practically complete elimination of the carbonaceous material and in the volatilization of the zinc contained in the mass. A large proportion of the zinc thus volatilized is, however, again caught or entrapped in the outer crust of the pile as zinc oxid, and, at the completion of the operation, this crust may be broken off and the zinc contained in it can then be recovered by treating the crust in the usual zinc retorts, or otherwise. At the completion of the operation, the pile will constitute a sintered mass which will contain whatever "metal values," such as gold, silver, copper, lead and the like, may be present therein and which can readily be broken up into large lumps suitable for withstanding the burden of the blast furnace charge. The pile, after this treatment, will be practically free of carbon and zinc, except in the outer crust which, as has been indicated, is to be removed and utilized for its zinc content.

So far as I am aware it is broadly new to concentrate zinc retort residues by combustion of their carbon content and by the simultaneous volatilization of the contained zinc and under conditions to cause the concentrated mass to sinter, and I desire it to be understood, therefore, that I intend to cover the operation generically whether the combustion takes place within an open pile, or whether the pile is inclosed within confining walls, as, for instance, within a suitable kiln or the like.

What I claim is:

1. The method of treating zinc retort residues which consists in concentrating them by combustion of their carbon content and simultaneously volatilizing the contained zinc, and catching the products of volatilization of the zinc in the outer layers of the pile; substantially as described.

2. The method of treating zinc retort residues which consists in concentrating them by the combustion of their carbon content and simultaneously volatilizing the contained zinc, and catching the products of volatilization of the zinc in the outer layers of the pile, the operation being conducted under conditions to cause the concentrated mass to sinter; substantially as described.

3. The method of treating zinc retort residues, which consists in arranging them in a pile in the open air, concentrating them by combustion of their carbon content and simultaneously volatilizing the contained zinc, the operation being conducted under conditions to cause the concentrated mass to sinter; substantially as described.

In testimony whereof I affix my signature, in the presence of two witnesses.

ARCHIBALD JONES.

Witnesses:
JAS. A. VEASEY,
LLOYD A. ROWLAND.

Copies of this patent may be obtained for five cents each, by addressing the "Commissioner of Patents, Washington, D. C."